Feb. 14, 1967     C. R. CAPPARELLE     3,303,696
TIRE PRESSURE GAUGE
Filed June 3, 1964
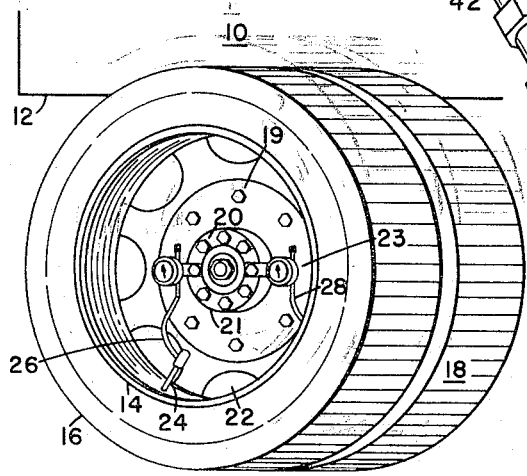
CARL R. CAPPARELLE
INVENTOR
BY
Thomas E. Sterling
ATTORNEY

United States Patent Office 3,303,696
Patented Feb. 14, 1967

3,303,696
TIRE PRESSURE GAUGE
Carl R. Capparelle, Ardell Lane, Bellefonte, Pa. 16823
Filed June 3, 1964, Ser. No. 372,208
3 Claims. (Cl. 73—146.8)

This invention relates to gauges for measuring fluid pressure within containers and more particularly to gauges for continuously measuring the pressure within pneumatic tires.

The need for maintaining proper air pressure within the pneumatic vehicle tires is well known. In the course of use on the road, should the vehicle tire become over or under inflated, it will wear excessively. In addition, an improperly inflated tire is a safety hazard in that it is prone to blow out and cause a vehicle accident. It is, therefore, desirable from the standpoint of both economy and safety to have a device which will immediately and continuously indicate the internal pressure within a vehicle tire so that incorrect inflation pressures may be remedied.

This need becomes increasingly important in tires used by large trucks, particularly those having double wheels coaxially mounted one adjacent to the other. For such a double wheel vehicle, it is particularly difficult to quickly and accurately determine the air pressure within the tire mounted on the inner wheel because the valve stem connected to this inner tire is frequently obscured by the outer wheel. Conventional methods for measuring tire pressure on both single and double wheel vehicles generally consist of applying a portable tire gauge to the valve stem of the tire and observing the indication of the gauge. This process necessitates unscrewing the valve cap of each tire, applying the portable pressure gauge to the stem, observing the reading, and then replacing the valve cap. A great deal of time is consumed by this procedure particularly when the vehicle has double truck tires with inaccessible valve stems.

This invention solves these problems by providing a permanently mounted tire pressure gauge for each tire which continuously indicates the tire's pressure. The gauge is mounted on the outer rim of the wheel and is readily observable at all times. Hence, it is necessary to only glance at the wheel of the vehicle to determine the internal pressure of the tire. The invention also provides a permanently attached, easily accessible valve stem connected to the air gauge through which air may be either released from or blown into the tire.

An object of this invention is, therefore, to provide a permanently mounted, easily visable tire pressure gauge upon the wheel of a vehicle which is constantly responsive to the internal pressure within the tire.

Another object of this invention is to provide a permanently mounted tire pressure gauge which has a readily accessible means for inflation or deflation of the attached tire.

Still another object of this invention is to provide an air gauge mountable upon all conventional vehicle wheels and which may be easily constructed and simply maintained.

These and other objects of this invention will become apparent during the detailed description of the embodiments which follow:

Referring now to the drawings:

FIGURE 1 is a perspective view of a double-wheel mounting on a truck upon which are mounted two embodiments of the present invention.

FIGURE 2 is a perspective view of an embodiment of the tire pressure gauge.

FIGURE 3 is a cross-sectional view of the pressure gauge taken along line 3—3 of FIGURE 2.

FIGURE 4 is a cross-sectional view of an alternate embodiment of the stem connector shown in FIGURES 2 and 3.

Referring now to the drawings and in particular to FIGURE 1, 10 represents the double-wheel assembly of a conventional truck body 12 comprised of outer rim 14 and outer tire 16 mounted thereon, and an inner rim (not shown) upon which is mounted inner tire 18. Outer rim 14 is secured to the driving axle (not shown) by means of lug bolts 19 while axle bolts 20 secure the axle mounting plate 21 in place. Rim 14 has openings 22 through which access may be had to the valve stem (not shown) of the inner tire 18. Two embodiments 23 of the present invention are mounted to rim 14 by means of axle bolts 20. One embodiment of the tire pressure gauge is connected to the valve stem 24 of outer tire 16 by means of air hose 26; the other embodiment connected to the valve stem (not shown) of inner tire 18 by means of air hose 28. Air hose 28 extends through an opening 22 in rim 14 when connected to the valve stem (not shown) of the inner tire 18.

Referring now to FIGURES 2 and 3, 30 represents a conventional circular pressure gauge having a pointer 32 which will move in response to variations in pressure within the gauge and indicate the intensity of pressure upon the dial 34 in pounds per square inch. The pressure range of gauge 30, of course, depends upon the tire pressure to be measured. For conventional truck tires, it was found that a pressure range of from 0 to 150 pounds per square inch was convenient. A nipple 36 on the rear portion of gauge 30 screws into the central passage of a T-shaped manifold member 38 which has two communicating lateral passages 37 and 39.

A mounting bracket 41 is secured to the bottom portion of manifold member 38 by welding or soldering and extends to a position lateral to gauge 30 then outward therefrom. This outwardly extending section of bracket 41 has a hole 43 therethrough used to bolt the bracket to the vehicle wheel. The precise configuration of bracket 41 and size of hole 43 may vary depending on the wheel to which it is fitted. The bracket is usually designed to hold gauge 30 as close to the wheel as possible to protect it from collision with outside objects. The mounting of the bracket on the rear wheels of trucks is usually done by means of axle bolts 20. Mounting to the front wheels of vehicles is frequently done by means of the lug bolts (not shown). The simplicity of the present embodiment and its adaptability to all vehicle wheels makes mounting a simple process.

Into one lateral passage 37 of the manifold 38 is screwed a 45-degree elbow fitting 40. Into the 45-degree face of this fitting 40 is screwed a manifold valve stem 42, the interior passage of which is positioned a conventional tire valve core 44 which will permit air to pass into stem 42 but prevents it from passing out unless the valve core is depressed. It was found that the 45-degree angle of the valve stem 42 was most convenient for the attachment of an inflating hose or the release of air although any forward facing valve stem is within the contemplation of this invention. Into the lateral passage 39 is screwed elbow fitting 46 upon which is secured an end portion of air hose 26 by means of coupler member 50. Elbow connector 46 is generally of a 90-degree type positioning air hose 26 in a direction opposite to that which dial 34 is facing. However, fitting 46 may be a straight connector which allows the air hose 26 to extend outwardly perpendicular to the plane of manifold 38 in a manner indicated by the dotted hose lines 48. The choice depends upon the configuration of the valve stems of the truck wheel onto which this embodiment of the invention is to be positioned. Coupler member 50 has an elongated end portion. When this end portion 50 is inserted into air hose 26 an extremely secure connection is obtained and the air hose may not be removed from the end portion 50 without the application of considerable force.

The opposite end of air hose 26 from that connected to connector 46 is coupled to valve stem connector 54 which is connected to the valve stem 24 of the vehicle tire 16. Valve stem connector 54 is a quick attachment type which may be easily and efficiently connected and disconnected from valve stem 24. The valve stem connector 54 is comprised of a hollow-cylindrical body 56 having at the interior end portion thereof a hollow cylindrical gasket 58 made of air sealing plastic or rubber type material. The interior opening of gasket 58 is sufficient to permit the insertion of the end portion of valve stem 24. A piston member 60 is inserted within cylindrical member 58 and has a laterally attached tube section 62 which is connected to hose 26 whereby the internal portion of piston 60 is in communication with the internal portion of air hose 26. A valve depresser pin 64 extended axially from the central portion of piston 60 is adapted to depress the conventional tire valve core within valve stem 24 when the valve stem 24 is inserted within adapter 54. A lever 66 is rotably attached to cylinder 58 by means of pin 68. When lever 66 is rotated the camming surface 70 thereon presses against piston 60 forcing piston 60 against gasket 58 which in turn seals valve stem 24.

Referring now to FIG. 4, there is shown an alternate embodiment of the valve stem connector 54. This embodiment is comprised of cylindrical fitting 72 having elongated portion 74 upon which annular protusions 76 are positioned. When air hose 26 is forced upon elongated portion 74, protrusions 76 prevent the air hose from being blown free under conditions of high pressure. A cylindrical valve stem connector 78 is axially attached to fitting 72 so that a passage 80 extends through each. The interior end portion of fitting 72 is interiorly threaded so as to screw upon the externally threaded portion of valve stem 24. Valve depression pin 82 is axially positioned in the interior end portion of fitting 78, by means of transverse pin 81, adapted to depress the valve core within valve stem 24, thus opening it.

Thus in operation, the embodiment of this invention is secured to axle mounting plate 21 by axle bolts 20. When two embodiments of this invention are to be attached to the same rim, they are positioned in diagonally opposite locations of plate 21 so that undue unbalance of the wheels will not result. The valve stem connector 54 is then positioned upon the end portion of valve stem 24 and lever 66 rotated so as to force piston 60 against gasket 58 sealing valve stem 24. Pin 64 bears against the valve core stem 24 opening it and allowing pressurized air within the tires 16 to flow through valve stem 24, valve connector 54, air hose 26, coupling 46, thence into manifold 38 and into gauge 30, thus allowing the gauge 30 to register the pressure within the tire. Should it be desired to add additional air to the tire, an air hose may be attached to stem 52 permitting pressurized air to flow therein. Air pressure may also be released. As may be seen, the 45-degree fitting 40 positions stem 42 in an outwardly disposed manner so that it may be conveniently reached to inflate or deflate the tire 16. Likewise, the gauge 34 and needle 32 of gauge 30 are readily observable at a glance by merely looking at the rim 14. Hence, a vehicle operator merely has to walk around his vehicle observing the outwardly facing gauges 30.

Should the alternate stem attaching device 54 of FIG. 4 be used, it is merely necessary to screw onto valve stem 24 cylindrical fitting 78. Pin 82 will then depress the valve core valve stem 24 in a manner previously described and the pressurized air will flow from the valve stem 24 into gauge 30 as previously described.

The present embodiment of this invention is very adaptable in that it may be easily attached and utilized on a variety of vehicle wheels, such as spoked wheels, solid wheels, or the like. The bracket 41 may be varied in length and hole size so that it is readily adaptable to the lug bolts and other fitable configurations of both front and back tires in both commercial and non-commercial vehicles alike.

Since other varied modifications and equivalents of this invention will occur to those skilled in the art, it is intended in the claims that follow shall not be limited by the particular embodiments of the invention that are shown or described herein but only by the prior art.

I claim:

1. In a tire pressure gauge removably attached to the rim of a vehicle wheel and in continuous communication with the tire valve stem of a pneumatic tire mounted upon said wheel, the combination comprising:
   a manifold member positioned upon said rim;
   a pressure gauge positioned on said manifold in an outwardly facing direction and in communication with said manifold;
   an outwardly facing readily accessible manifold valve stem member attached to said manifold and in communication therewith;
   a valve core member positioned within said manifold valve stem, said stem member oriented to withhold the outward flow of air through said manifold valve stem member, whereby the air pressure in said pneumatic time may be regulated by the release or addition of air through said valve core member;
   a flexible hose member, one end portion of which is attached to and in communication with said manifold member;
   a valve stem connecting member connected to and in communication with said flexible hose, said valve stem connecting member comprised of:
   a valve stem receiving member having an opening therein for the reception of a valve stem;
   a flexible gasket member circumferentially positioned within said receiving member about said opening;
   a slideable piston member positioned within said receiving member adjacent to said gasket member, said piston member having an opening therein in communication with said flexible hose;
   a pin member positioned upon said piston member and extending to said opening, said pin member adapted to open said valve core of said tire valve stem when said tire valve stem is inserted in said opening; and
   a lever member rotably positioned within said valve stem receiving member in contact with said piston member, whereby when said lever member is rotated, it exerts pressure on said gasket member through said piston member causing said gasket member to seal said tire valve stem within said opening.

2. The combination as claimed in claim 1 in which said manifold valve stem member extends from said manifold in a forward facing direction.

3. The combination as claimed in claim 2 in which said manifold valve stem member extends from said manifold at an angle of about 45 degrees from said wheel rim.

References Cited by the Examiner

UNITED STATES PATENTS 2,800,795   7/1957   Trinca _____ 73—146.3
3,208,425   9/1965   Jousam et al. _____ 73—146.8 X LOUIS R. PRINCE, *Primary Examiner.*

D. O. WOODIEL, *Assistant Examiner.*